United States Patent [19]

Abreu

[11] Patent Number: 5,348,255
[45] Date of Patent: Sep. 20, 1994

[54] SYSTEM AND METHOD FOR SENSING ATTITUDE OF A SPACECRAFT WITH EQUILIZED STAR TRACKER ERRORS ALONG THREE ORTHOGONAL AXES

[75] Inventor: Rene Abreu, New Fairfield, Conn.

[73] Assignee: Hughes Aircraft Company, Los Angeles, Calif.

[21] Appl. No.: 892,461

[22] Filed: Jun. 2, 1992

[51] Int. Cl.⁵ .............................................. B64G 1/36
[52] U.S. Cl. ................................................... 244/171
[58] Field of Search .............................. 244/171, 164; 250/203.6, 211

[56] References Cited

U.S. PATENT DOCUMENTS

| 3,875,404 | 4/1975 | Fletcher | 244/171 |
| 4,358,076 | 11/1982 | Lange et al. | 244/171 |
| 4,997,146 | 3/1991 | Weyandt, Jr. | 244/171 |
| 5,042,752 | 8/1991 | Surauer et al. | 244/171 |
| 5,080,307 | 1/1992 | Smay et al. | 244/171 |
| 5,092,543 | 3/1992 | Goodzeit et al. | 244/171 |

Primary Examiner—Galen Barefoot
Attorney, Agent, or Firm—Michael W. Sales; Wanda K. Denson-Low

[57] ABSTRACT

A star tracker 10 of an attitude control system 8 on board a spacecraft 9 is positioned so that the tracker's line-of-sight vector 12 intersects the origin of the reference axis but is askew from any reference axis of the spacecraft. The attitude control system transforms the dam from a star tracker reference coordinate system to a spacecraft reference coordinate system so as to allow control of the attitude of the spacecraft without modification of existing equipment.

11 Claims, 2 Drawing Sheets

SYSTEM AND METHOD FOR SENSING ATTITUDE OF A SPACECRAFT WITH EQUILIZED STAR TRACKER ERRORS ALONG THREE ORTHOGONAL AXES

FIELD OF THE INVENTION

The present invention relates to a system and method for sensing the attitude of a spacecraft in space. More particularly, the present invention relates to a preferred orientation for the line-of-sight vector of a star tracker of an attitude control system with respect to reference axes of a spacecraft so as to provide the control system with a star tracker having equal pointing errors about three reference axes of the spacecraft.

BACKGROUND OF THE INVENTION

Star trackers are typically used on-board spacecraft as a means for providing data for adjustment of the attitude of the spacecraft in space. The star trackers provide positional reference data to the attitude sensing system of the spacecraft so that the attitude of the spacecraft may be adjusted and controlled. Star trackers utilizing charge-coupled-device (CCD) arrays for obtaining star image sense position with respect to two axes which are orthogonal to the line-of-sight vector of the star tracker (line-of-sight vector is normal to the CCD array).

Heretofore, the line-of-sight orientation of star trackers installed on-board spacecraft are typically aligned with and use the spacecraft reference axes, such as the roll, pitch, or yaw axes, as the reference axes for the tracker. Because the CCD arrays can only acquire data with respect to two dimensions, the spacecraft reference axis along the CCD array line-of-sight vector, which is normal to the array, has degraded accuracy. For example, star trackers utilizing the pitch and yaw reference axes of the spacecraft as reference axes for the tracker have degraded accuracy of roll knowledge about the roll axis of the spacecraft. This degraded accuracy about the roll axis is due to the fact that the tracker's line-of-sight vector and the roll axis are identical and normal to the CCD array, and thus the tracker has poor sensitivity along the roll axis. To compensate for this insensitivity, a second star tracker is necessary to provide data to the attitude control system about the roll axis (the third reference axis) so as to give the spacecraft attitude system accurate position information with respect to all three spacecraft reference axes, and, thus, accurate attitude data.

The system and method of the present invention improves the sensitivity of the star tracker with respect to the third spacecraft axis and, thus, improves the accuracy of the spacecraft attitude control system by providing an on-board star tracker having equal pointing error about all three axes of the spacecraft. The present invention also provides the advantage of less weight on-board the spacecraft because, in some instances, attitude control may be accomplished with a single tracker rather than two.

SUMMARY OF THE INVENTION

The present invention relates to a system and method for sensing the attitude of a spacecraft in space by utilizing a star tracker with equal position error with respect to a set of reference axes on-board a spacecraft. The attitude sensing system utilizes a star tracker which is positioned with respect to the spacecraft reference axes so that the line-of-sight vector of the tracker is not aligned with a spacecraft. The positioning of the tracker equally distributes the tracker errors with respect to the spacecraft reference coordinate system. Data output from the tracker is transformed from the tracker coordinate system to the spacecraft coordinate system so that the spacecraft attitude control processor can make appropriate adjustments to the spacecraft's attitude.

One objective of the present invention is to provide an attitude control system incorporating a star tracker with equal pointing error about three reference axes of a spacecraft.

Another objective of the present invention is to provide a spacecraft attitude control system which may utilize one star tracker.

Other objects and advantages of the present invention will become apparent to those skilled in the art from the following detailed description read in conjunction with the attached drawings and claims appended hereto.

DETAILED DESCRIPTION OF THE INVENTION

Figure 1:
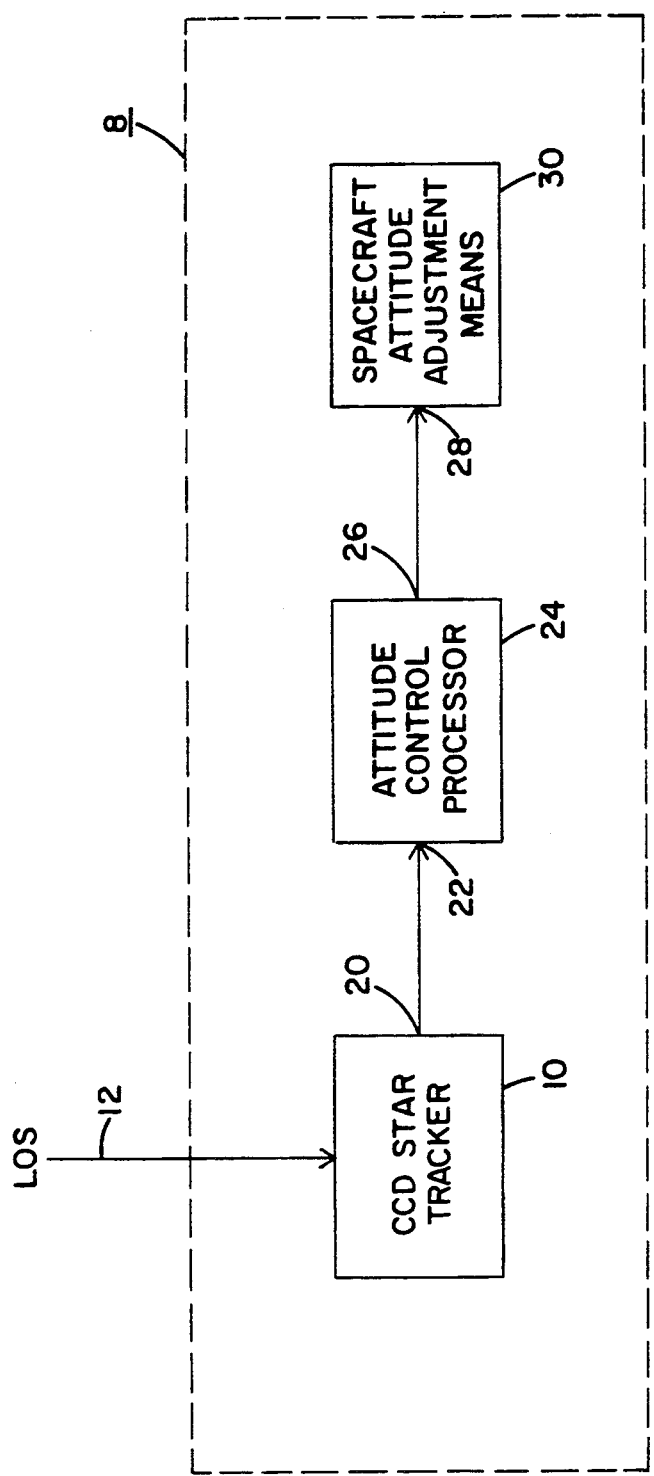
FIG. 1 is a block diagram of an attitude control system of a spacecraft including the star tracker.
Figure 2A:
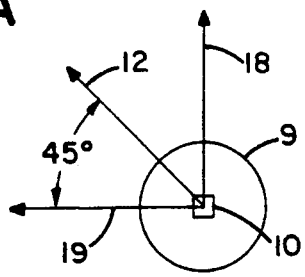
FIG. 2a is a rear view schematic diagram of a spacecraft showing three reference axes of the spacecraft and the orientation of the line-of-sight vector of a star tracker with respect to the spacecraft's three reference axes.
Figure 2B:
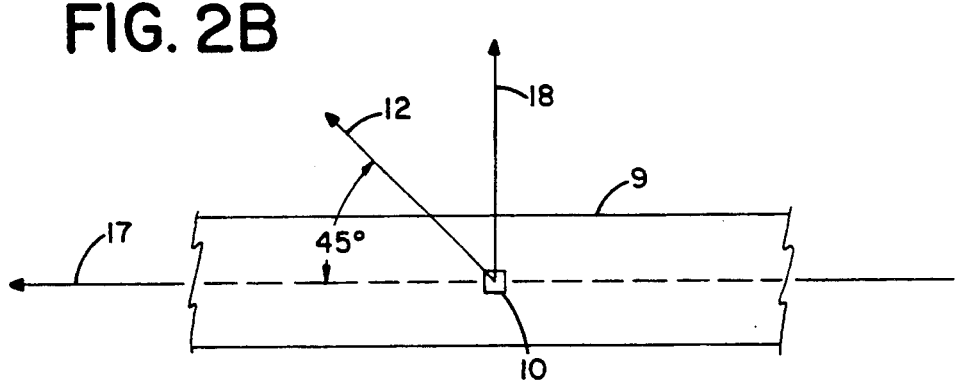
FIG. 2b is a side view schematic diagram of a spacecraft showing three reference axes of the spacecraft and the orientation of the fine-of-sight vector of a star tracker with respect to the spacecraft's three reference axes.
Figure 2C:
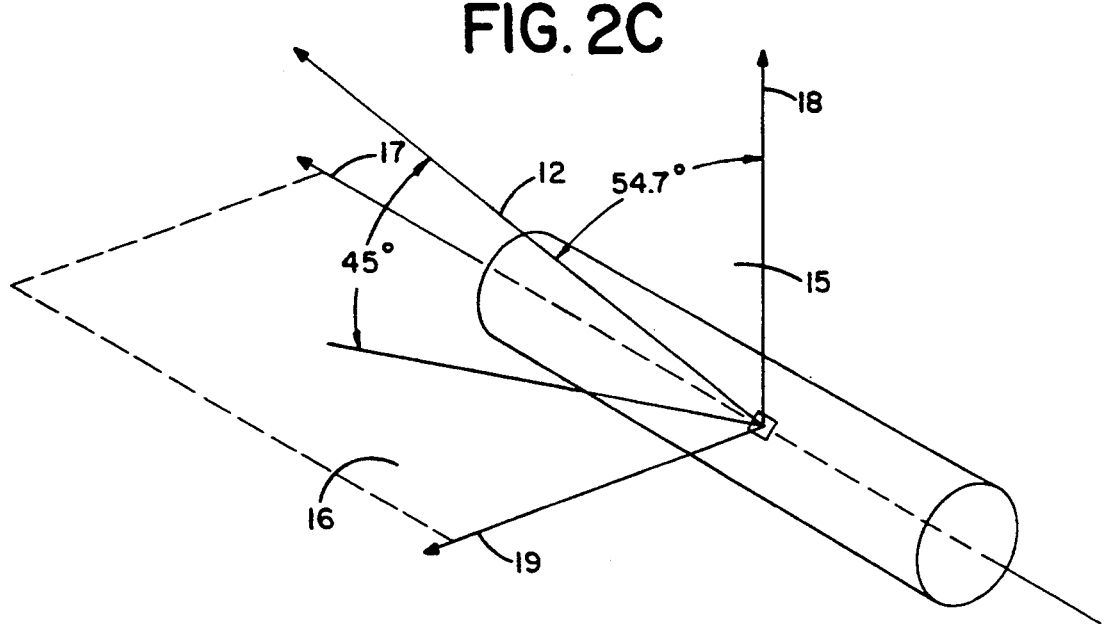
FIG. 2c is an isometric view schematic diagram of a spacecraft showing three reference axes of the spacecraft and the orientation of the line-of-sight vector of a star tracker with respect to the spacecraft's three reference axes.

FIG. 1 shows a block diagram of a spacecraft attitude control system 8 with corresponding tracker data input. FIGS. 2a, 2b, and 2c show the orientation of a star tracker line-of-sight vector having equal pointing error with respect to three reference axes of a spacecraft. Referring to the Figures, the attitude control system 8 utilizes a tracker 10 for sensing attitude of a spacecraft 9. The light gathering ability of the tracker 10 is comprised of a charge-couple-device (CCD) focal plane (not shown) having a line-of-sight vector normal to its surface. The tracker 10 is positioned on the spacecraft so as to provide the line-of-sight vector 12 vector which is not aligned with any reference axis of the spacecraft. In one embodiment, the line-of-sight vector 12 is positioned so as to trisect the reference axes of the space craft. Where the reference axes of the spacecraft are orthogonal, the tracker 10 is positioned on the spacecraft 9 so that its line-of-sight vector 12 subtends an angle of 54.7° along a plane between the line-of-sight vector and any reference axis. For example, a 54.7° angle is formed by the intersection of the line-of-sight vector and yaw axis 18 along plane 15 which is defined by the intersection of the line-of-sight 12 and the yaw axis 18. Thus, the line-of-sight vector is approximately 54.7° with respect to roll axis 17, pitch axis 19 and yaw axis 18. This orientation places the line-of-sight 12 vector at an elevation of 45° with respect to any plane defined by two of the spacecraft's three reference axes. For example, the line-of-sight vector is elevated 45° with respect to roll-pitch plane 16 defined by the intersection of the roll axis 17 and the pitch axis 19 of the spacecraft. Thus, this orientation provides a line-of-sight vector which trisects the reference axes of the spacecraft and provides equal pointing error of the line-of-sight vector with respect to all of the reference axes of the spacecraft.

As seen in FIG. 1, data output bus 20 of tracker 10 is connected to an input 22 of an attitude control processor 24. In one embodiment, the data on output bus 20 is first transformed from the tracker reference axes to the spacecraft reference axes. The transformation from tracker reference axes to spacecraft reference axes is accomplished by transformation matrix M, wherein M is defined as:

$$P_\alpha = (m_{11})(P_x) + (m_{12})(P_y) + (m_{13})(P_z)$$

$$P_6 = (m_{21})(iP_x) + (m_{22})(P_y) + (m_{23})(P_z)$$

$$P_\gamma = (m_{31})(P_x) + (m_{32})(P_y) + (m_{33})(P_z)$$

where $P_\alpha$ is the transformed value on the roll reference axis of the spacecraft;

$P_6$ is the transformed value on the yaw reference axis of the spacecraft;

$P_\gamma$ is the transformed value on the pitch reference axis of the spacecraft;

$P_x$ is the value on a x reference axis of the tracker;
$P_y$ is the value on a y reference axis of the tracker;
$P_z$ is the value on a z reference axis of the tracker;

$m_{ij}$ are the rotation matrix dement values for a 54.7° rotation about the tracker's x reference axis followed by a 45° rotation about the tracker's intermediate or rotated line-of-sight vector, wherein $M_{11}$ is equal to the Cos (45°);
$M_{12}$ is equal to the product, Sin (45°) Cos (54.7°);
$M_{13}$ is equal to the product, Sin (45°) Sin (54.7°);
$M_{21}$ is equal to - Sin (45°);
$M_{22}$ is equal to the product Cos (45°) Cos (54.7°);
$M_{23}$ is equal to the product Cos (45°) Sin (54.7°);
$M_{31}$ is equal to zero;
$M_{32}$ is equal to zero; and
$M_{33}$ is equal to Cos (54.7°)

The transformed data received through input 22 of the attitude control processor 24 is used to send control signals through data output bus 26 to input 28 of a spacecraft attitude adjustment means 30 so as to adjust the attitude of the spacecraft. The adjustment of attitude may be accomplished by any adjustment means including a plurality of position adjusting rockets (not shown) which are fired for a predetermined length of time. Although the data is transformed by the tracker 10 in the embodiment described above, the data transformation may also be performed by the attitude control processor 24 or by the adjustment means 30.

Thus, what has been described is a system for adjusting the attitude of a spacecraft utilizing a tracker having equal position error with respect to a reference coordinate system of a spacecraft.

What is claimed is:

1. A tracker for an attitude control system of an object having a set of reference axes that define the reference coordinate system of the object, said tracker comprising:
  a planar light detecting array having a line-of-sight vector normal to said array and a data output for outputting data;
  means for positioning said light detecting array on said object, such that said line-of-sight vector intersects the origin of the reference axes and is askew from each reference axis of said object.

2. The tracker of claim 1, wherein the means for positioning said light detecting object positions the array such that the line-of-sight vector trisects the intersection of said reference axes.

3. The tracker of claim 1, wherein the planar light detecting array is a charge coupled device.

4. A system for controlling the attitude of an object, said object having a set of reference axes which define the reference coordinate system of the object, said system comprising:
  a planar light detecting array having a line-of-sight vector normal to said array and a data output for outputting data,
  means for positioning said light detecting army on said object, such that said line-of-sight vector intersects the origin of the reference axes and is askew from each reference axis of said object; and
  means connected to the data output of said tracker for responsively controlling the attitude of said object with respect to said reference axes.

5. A system on-board a spacecraft for controlling the attitude of a spacecraft, said spacecraft having a set of reference axes which define the reference coordinate system of the spacecraft, said system comprising:
  a star tracker including a planar light detecting array having a line-of-sight vector normal to said array and a data output for outputting tracking data;
  means for positioning said tracker on said spacecraft, such that said line-of-sight vector intersects the origin of the reference axes and is askew from each reference axis of said spacecraft; and
  means connected to the data output of said tracker for responsively controlling the attitude of said spacecraft with respect to said reference axes.

6. The system of claim 5, wherein the means for positioning said tracker positions the array such that its line-of-sight vector has equal components along each of said reference axes of said spacecraft.

7. The system of claim 5, wherein the means for positioning said tracker positions the array on said spacecraft having orthogonal reference axes defined by roll, pitch and yaw axes such that the angle of its line-of-sight vector and each reference axis subtends an angle of 54.7°.

8. The system of claim 5, wherein the tracker includes means for transforming tracking data from a reference coordinate system orthogonal to said array to the reference coordinate system defined by said spacecraft reference axes.

9. The system of claim 5, wherein the means for responsively controlling the attitude of the spacecraft includes means for transforming tracking data from a reference coordinate system orthogonal to said array to the reference coordinate system defined by said spacecraft reference axes.

10. The system of claim 5, wherein the light detecting planar array is a charge coupled device.

11. A method for controlling the attitude of a spacecraft in space, said method comprising:

acquiring data about a field of view of a star tracker having a light detecting planar array with a line-of-sight vector normal to said array and askew from any axis of a set of axes defining reference axes for said spacecraft, and a data output for outputting tracking data;

transforming said data from a tracker reference coordinate system orthogonal to said line-of-sight vector to a reference coordinate system defined by said spacecraft reference axes;

outputting said transformed data to a means for adjusting the attitude of said spacecraft; and adjusting the attitude of said spacecraft.

* * * * *